United States Patent [19]
Guillet et al.

[11] 3,799,674
[45] Mar. 26, 1974

[54] SYSTEM ENABLING THE DETECTING OF MOVEMENTS OF A FIRST ELEMENT IN RELATION TO ANOTHER

[75] Inventors: Hubert Guillet, Saint-Germain-les-Arpajon; Jean Cornillault, Nozay, both of France

[73] Assignees: Compagnie General d'Electricite, Paris; Compagnie Industrielle des Lasers, Marcoussis, both of, France

[22] Filed: Apr. 7, 1972

[21] Appl. No.: 241,942

[30] Foreign Application Priority Data
Apr. 9, 1971   France .............................. 71.12778

[52] U.S. Cl. ................. 356/138, 356/152, 356/172
[51] Int. Cl. ........................................... G01b 11/26
[58] Field of Search ............ 356/32, 138, 152, 172; 250/220 M

[56] References Cited
UNITED STATES PATENTS
2,703,505   3/1955   Senn .............................. 356/172 X 3,551,057   12/1970   Hamilton et al. ..................... 356/172
3,603,688   9/1971   Smith - Vaniz ................ 250/220 M
3,197,643   7/1965   Morris ........................... 250/220 M
3,398,287   8/1968   Krogstad et al .................. 356/32 X
3,504,979   4/1970   Stephany ........................... 356/172

Primary Examiner—Ronald L. Wibert
Assistant Examiner—F. L. Evans
Attorney, Agent, or Firm—Sughrue, Rothwell, Mion, Zinn & Macpeak

[57] ABSTRACT

System enabling the detecting of movements of a first element in relation to another, comprising a laser generator emitting a light beam co-operating with a fixed reference on one of the two elements, the laser generator being fixed on the other element, its beam being pointed on a photo-sensitive element arranged on the same element as that on which the laser generator is fixed.

7 Claims, 1 Drawing Figure

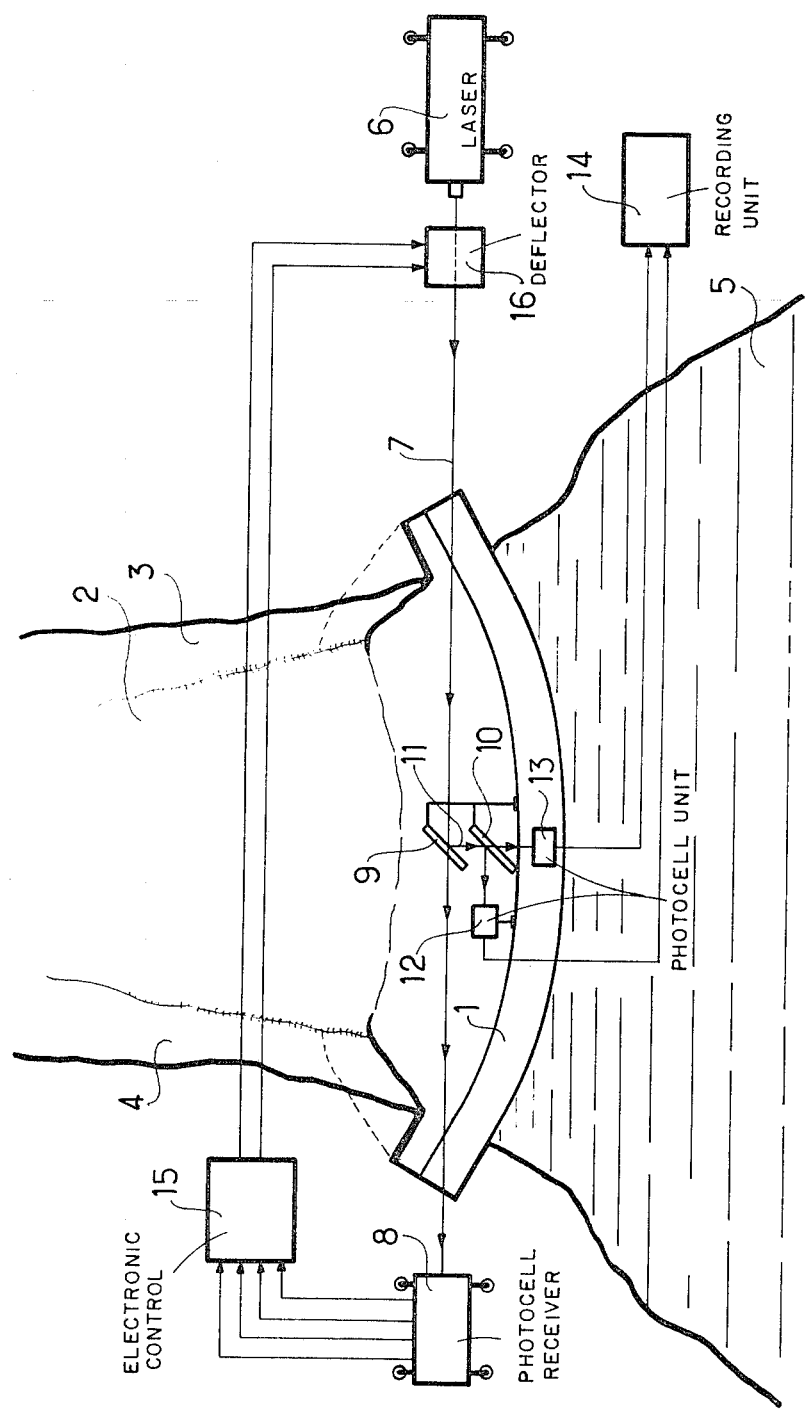

SYSTEM ENABLING THE DETECTING OF MOVEMENTS OF A FIRST ELEMENT IN RELATION TO ANOTHER

BACKGROUND OF THE INVENTION

1. Field of the Invention

The present invention concerns a system for enabling the detection of a movement of one element in relation to another.

2. Description of the Prior Art

Systems enabling the detecting of the movements of one element in relation to another, for example, the possible movement of a part of a dam in relation to the surrounding ground in which its foundations are laid, are known.

It is very important to be able to check if such a construction udergoes movements or deformations in relation, more particularly, to the ground on which it rests and thus to be in a position to detect possible defects in structure and to avoid certain catastrophies, such as have already occurred on numerous occasions.

Known systems, for example those enabling the detection of a movement of a dam or a part thereof, generally comprise a laser generator placed as a stationary unit on the ground on which the dam is built, at a certain distance from the latter.

The laser is directed so that its beam is approximately facing a reference mark on the dam; a photo-sensitive element such, as for example, one or several 4-cell units whose outputs are connected, for example, to a recording element, have been used as this reference mark.

With such a system, when the dam undergoes a movement or a deformation, the photo-sensitive element moves in relation to the laser beam which, coming from the laser generator fixed to the ground, is considered as stationary. On moving, this photo-sensitive element makes it possible to observe, and more especially to detect, a deformation of the dam and thus to be able to take all necessary measures to avoid catastrophies.

These systems nevertheless have disadvantages. Indeed, even if a laser generator is arranged in a fixed position at a point on the ground, it is still subjected to vibrations or even to shocks despite all the protective measures which can be taken, this generally causing spurious rotations which result in an appreciable movement of the beam in relation to the fixed reference mark on the dam. Thus, it is impossible to know, in that case, whether the photo-sensitive element has moved in relation to the laser beam, or the laser beam has moved in relation to the photo-sensitive element.

In such circumstances, and more particularly in the case of the supervision of dams, it is necessary that there be no doubt about the interpretation of the movements.

SUMMARY OF THE INVENTION

The present invention aims at overcoming a great part of these disadvantages.

The present invention has for its object a system for enabling the detecting of the possible movements of a first element in relation to a second element, the system comprising a laser generator emitting a light beam arranged at a first point of the second element, the light beam co-operating with a reference mark fixed to the first element and means for keeping the beam on a second point of the said second element, the said second point not coinciding with the said first point.

The present invention will be better understood from the following description given with reference to the accompanying drawing by way of illustration but not limitation.

BRIEF DESCRIPTION OF THE DRAWING

The single figure shows, in diagrammatic form, an embodiment of a system according to the invention.

DESCRIPTION OF THE PREFERRED EMBODIMENT

The embodiment of the system according to the invention will be described by means of a particular application: the supervision of a dam stretching across a valley and holding back a volume of water.

The figure shows very diagrammatically an air view of a dam 1 stretching across a valley 2 limited by two mountain slopes 3 and 4 and holding back a great volume of water 5.

The system enabling the supervision of possible deformations or movements of a part of the dam 1, for example, the central part, comprises a laser generator 6 solidly fixed on one slope of the valley, for example, the slope 3, emitting a light beam 7, which is as fine as possible, towards a point on the other slope 4 of the valley on which a photo-sensitive receiving element 8 is arranged. The photo-sensitive element 8 can consist of a 4-cell unit whose ouputs are connected to an electronic control element 15 enabling, for example, the controlling of an optical deflector 16 positioned at the output of the laser generator 6. Deflector 16 may consist of, for example, a diasporameter which can be controlled, that is, a device comprising two prisms and means for driving these two prisms in a rotational movement in relation to each other about the same axis crossing the faces of these prisms and coinciding with the axis of the beam emerging from the generator 6 in order to be able to give the beam 7 all possible directions in space. However, the deflector system 16 can, of course, be replaced more particularly by a system automatically adjusting the position of the laser generator itself, in which case the laser generator direction control system can consist of a mounting plate, to which is fixed the laser generator, installed on the slope of the valley through a gearing system enabling the mounting plate to be directed in space in relation to a strictly stationary base.

The beam 7 is directed so that it passes in the proximity of the dam 1 on which are fixed the means enabling the position of a part of the dam 1 to be reference marked in relation to the light beam 7. These means have been very diagrammatically illustrated in the figure by a first semi-transparent separator blade 9 reflecting a part of the light beam 7 onto a second separator blade 10 enabling, respectively, two portions of the reflected beam 11 to be directed onto two photo-sensitive elements 12 and 13 which can consist, by way of an example, of 4-cell units. The outputs of these 4-cell units are connected to an electronic system 14, for example a recording unit enabling the visual display of the value of the signals obtained at the output of the 4-cell units 12 and 13. The separator blades 9 and 10 and the photo-sensitive elements or 4-cell units 12 and 13 are fixed to the dam 1 and can, to great advantage, comprise means enabling their direction or their position to be controlled and then enabling them to be fixed finally to the part of the dam 1 which it is required to supervise.

The figure shows means enabling the position of the dam in relation to the beam 7 to be checked by two photo-sensitive 4-cell units 12 and 13 receiving, respectively, two perpendicular beams enabling movements of the dam to be checked by their components in two perpendicular directions in the plane shown by that in the figure. It is quite evident that if it is necessary to supervise the movements of the dam and to detect deformations throughout space, it is sufficient to add a separator blade on the reflected beam 11 to reflect a part of the latter in a direction perpendicular to the directions of the beams which respectively strike the 4-cell units 12 and 13, and a third 4-cell unit to receive that third reflected beam, the output of this third 4-cell unit being connected, for example, to a third input of the recording unit 14.

The adjustments and operation of the device are as follows:

The laser generator 6 is arranged so as to emit its beam 7 in the direction of the photo-sensitive element 8, and the electronic control element 15 is adjusted so that the beam 7 is constantly centered on the photo-sensitive element 8. Thus, independently of the fluctuations to which either the laser generator 6 or the photo-sensitive element 8 can be subjected, the beam 7 always passes substantially through the two fixed points of the slopes of the valley which do not coincide, these points being approximately determined by the fixing points of the laser generator 6 and the photo-sensitive element 8. Once this first adjustment is obtained, the direction of the various separator blades, such as the blades 9 and 10, is adjusted so that the beams reflected thereby are constantly centered on these 4-cell units 12 and 13 so that their output signals are, for example, all equal.

Thus, it can be seen that if the laser generator 6 is subjected to a spurious movement, which is often a rotation, the electronic control device 15 connected with the 4-cell unit 8 controlling the deflector 16 enables the beam 7 to be kept on the center of the 4-cell unit 8 by compensating the rotation of the beam sent out by the laser generator by an opposite deflection by the deflector 16. Due to this fact, since the beam 7 is controlled so as to impinge constantly on the center of the 4-cell unit 8, a rotation of the laser generator 6 does not cause an appreciable movement of the path of the beam 7, thereby making possible the detection of a movement of the dam 1, this path being between the laser generator 6 and the 4-cell unit 8. Thus, if circumstances lead to the observing of the appreciable variations of the signals at the output of the 4-cell units 12 and 13, it is then just about certain, with a great probability, that it is the part of the dam on which the cells 12 and 13 are arranged which has undergone a movement.

While the invention has been particularly shown and described with reference to a preferred embodiment thereof, it will be understood by those skilled in the art that various changes in form and details may be made therein without departing from the spirit and scope of the invention.

We claim:

1. In a system for detecting possible movements of a first element relative to a second element, said system including a laser generator emitting a light beam, said generator being fixed at a first point on said second element, first photosensitive means fixed relative to a reference mark on said first element for sensing relative movement between said reference mark and said light beam, the improvement for compensating for spurious movements of said laser generator relative to said first point comprising:
   a. second photosensitive means fixed to a second point on said second element for receiving said light beam and producing an electrical control signal indicative of deviations of said received light beam from said second point, said reference mark being located between said first and second points of said second element;
   b. controllable beam directing means responsive to said control signal for directing said light beam to keep it on said second point; and
   c. beam splitter means for directing a portion of said light beam onto said first photosensitive means.

2. The improvement defined in claim 1 wherein said first photosensitive means comprises at least a first 4-photocell unit, and further comprising display means connected to the output of said unit for displaying the relative movement between said reference mark and said light beam.

3. The improvement defined in claim 2 wherein said second photosensitive means comprises a second 4-photocell unit, the center of which corresponds to said second point of said second element.

4. The improvement as defined in claim 3 wherein said reference mark is located substantially half-way between said first and second points of said second element.

5. The improvement defined in claim 3 wherein said controllable beam directing means comprises controllable beam deflector means in the path of said light beam for deflecting the beam in response to said control signal such that the beam is kept on said center of said second 4-photocell unit, said deflector means being located on said second element between said laser generator and said reference mark.

6. In a system according to claim 5, said deflector means comprising two prisms and means for driving said two prisms in a rotational movement each in relation to the other about an axis crossing the faces of said prisms and coinciding with the axis of the beam emerging from said laser generator.

7. In a system according to claim 1 wherein said first element is a dam and said second element comprises the walls of a valley which are continguous to opposite ends of said dam, and wherein said first point is on one of said walls and said second point is on the other of said walls.

* * * * *